（12）United States Patent
Petersson et al.

(10) Patent No.: US 9,893,788 B2
(45) Date of Patent: Feb. 13, 2018

(54) NODE IN A WIRELESS COMMUNICATION SYSTEM WITH FOUR BEAM PORTS AND CORRESPONDING METHOD

(71) Applicant: TELEFONAKTIEBOLAGET LM ERICSSON (PUBL), Stockholm (SE)

(72) Inventors: Sven Petersson, Sävedalen (SE); Mona Hashemi, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 100 days.

(21) Appl. No.: 15/100,941

(22) PCT Filed: Dec. 4, 2013

(86) PCT No.: PCT/EP2013/075586
§ 371 (c)(1),
(2) Date: Jun. 1, 2016

(87) PCT Pub. No.: WO2015/081999
PCT Pub. Date: Jun. 11, 2015

(65) Prior Publication Data
US 2016/0301458 A1    Oct. 13, 2016

(51) Int. Cl.
*H01Q 21/00* (2006.01)
*H04B 7/06* (2006.01)
(Continued)

(52) U.S. Cl.
CPC ........... *H04B 7/0617* (2013.01); *H01Q 1/246* (2013.01); *H01Q 21/08* (2013.01); *H01Q 21/205* (2013.01);
(Continued)

(58) Field of Classification Search
CPC ........ H01Q 1/246; H01Q 21/08; H01Q 21/06; H01Q 21/205; H01Q 21/26; H01Q 25/00; H04B 7/06; H04B 7/10
(Continued)

(56) References Cited

U.S. PATENT DOCUMENTS 6,144,339 A * 11/2000 Matsumoto ........ H01Q 21/0025
342/361
8,981,993 B2    3/2015 Petersson et al.
(Continued)

FOREIGN PATENT DOCUMENTS

WO    2011050866 A1    5/2011

OTHER PUBLICATIONS

International Search Report and Written Opinion dated Aug. 29, 2014, in International Application No. PCT/EP2013/075586, 9 pages.

*Primary Examiner* — Dameon E Levi
*Assistant Examiner* — Hasan Islam
(74) *Attorney, Agent, or Firm* — Rothwell, Figg, Ernst & Manbeck, P.C.

(57) ABSTRACT

The present invention relates to a communication node with at least one antenna arrangement having four first antenna devices with corresponding antenna port pairs. Each pair of antenna ports comprising a corresponding first antenna port for a first polarization and second antenna port for a second orthogonal polarization. A beamforming arrangement comprises four beam ports and is configured to apply beam weights to each one of the antenna ports.
The present invention also relates to a corresponding method.

10 Claims, 3 Drawing Sheets

(51) Int. Cl.
  *H04B 7/10* (2017.01)
  *H01Q 1/24* (2006.01)
  *H01Q 21/08* (2006.01)
  *H01Q 21/20* (2006.01)
  *H01Q 21/26* (2006.01)
  *H01Q 25/00* (2006.01)

(52) U.S. Cl.
  CPC .............. *H01Q 21/26* (2013.01); *H01Q 25/00* (2013.01); *H04B 7/10* (2013.01)

(58) Field of Classification Search
  USPC ................. 343/757, 758, 853, 893; 342/368, 342/371–374
  See application file for complete search history.

(56) References Cited

U.S. PATENT DOCUMENTS

| | | | |
|---|---|---|---|
| 9,214,720 B2* | 12/2015 | Athley | H01Q 1/246 |
| 2009/0289864 A1* | 11/2009 | Derneryd | H01Q 1/246 |
| | | | 343/758 |
| 2012/0212372 A1* | 8/2012 | Petersson | H01Q 3/26 |
| | | | 342/373 |

* cited by examiner

NODE IN A WIRELESS COMMUNICATION SYSTEM WITH FOUR BEAM PORTS AND CORRESPONDING METHOD

CROSS REFERENCE TO RELATED APPLICATION(S)

This application is a 35 U.S.C. § 371 National Phase Entry Application from PCT/EP2013/075586, filed Dec. 4, 2013, designating the United States, the disclosure of which is incorporated herein in its entirety by reference.

TECHNICAL FIELD

The present invention relates to a node in a wireless communication system. The node comprises at least one antenna arrangement, where each antenna arrangement in turn comprises a first antenna device with a first pair of antenna ports and a first phase center, a second antenna device with a second pair of antenna ports and a second phase center, a third antenna device with a third pair of antenna ports and a third phase center, and a fourth antenna device with a fourth pair of antenna ports and a fourth phase center. The first phase center and the second phase center are separated by a first distance, the second phase center and the third phase center are separated by a second distance, and the third phase center and the fourth phase center are separated by the first distance. Each pair of antenna ports comprises a corresponding first antenna port and second antenna port. Each antenna device comprises at least one corresponding dual polarized antenna element arranged for transmitting and/or receiving signals at a first polarization via the corresponding first antenna port, and for transmitting and/or receiving signals at a second polarization via the corresponding second antenna port. The polarizations are mutually orthogonal. Each antenna arrangement further comprises a beamforming arrangement which comprises four beam ports and is configured to apply beam weights to each one of the antenna ports.

The present invention also relates to a method for generating four beam ports using a first pair of antenna ports related to a first phase center, a second pair of antenna ports related to a second phase center, a third pair of antenna ports related to a third phase center, and a fourth pair of antenna ports related to a fourth phase center. The first phase center and the second phase center are separated by a first distance, the second phase center and the third phase center are separated by a second distance, and the third phase center and the fourth phase center are separated by the first distance. Each pair of antenna ports have a corresponding first antenna port and second antenna port. Each first antenna port is used for transmitting and/or receiving signals at a first polarization, and each second antenna port is used for transmitting and/or receiving signals at a second polarization. The polarizations are mutually orthogonal.

BACKGROUND

In mobile telephony communication systems, different types of antennas are used for transmission and reception of signals. An ordinary type of antenna is a so-called array antenna where antenna elements are arranged in adjacently arranged columns, one after the other.

When using array antennas, as for example used in TD-LTE (Time Division-Long Term Evolution), there is often a need to define beam ports with an associated beam pattern. These beam ports have different radiation characteristics than the individual, physical, ports of the array antenna. This is normally achieved by means of beam forming, which is commonly known, but in many cases this results in that power utilization becomes poor. The ultimate goal is to define ports with desired beam characteristics and with good power utilization.

Two beam ports may for example be used for CRS:s (cell specific reference signals), where the method predominantly used for the two CRS ports is a conventional beam forming where a signal is weighted and transmitted over multiple ports of the same polarization. This results in many cases in very poor power resource utilization.

WO 2011050866 and US 2012274514 describe dual polarized beamforming, where two beam ports may be obtained from a number of antenna ports of orthogonal polarizations. The beam ports have orthogonal polarizations for all angles.

However, now there is a desire to obtain primarily four beam ports, for example CRS ports, and for example implemented by means of dual polarized beamforming, from a four column dual polarized array antenna. The beam ports form two groups for which a port in one group has a polarization that is mutually orthogonal to the polarization of the ports in the other group. The two polarizations should be mutually orthogonal for all angles at the beam ports.

SUMMARY

It is an object of the present invention to provide a four column dual polarized array antenna with four beam ports, where the beam ports form two groups for which a port in one group has a polarization that is mutually orthogonal to the polarization of the ports in the other group. The two polarization states should be mutually orthogonal for all angles at the beam ports.

Said object is obtained by means of a node in a wireless communication system. The node comprises at least one antenna arrangement, where each antenna arrangement in turn comprises a first antenna device with a first pair of antenna ports and a first phase center, a second antenna device with a second pair of antenna ports and a second phase center, a third antenna device with a third pair of antenna ports and a third phase center, and a fourth antenna device with a fourth pair of antenna ports and a fourth phase center. The first phase center and the second phase center are separated by a first distance, the second phase center and the third phase center are separated by a second distance, and the third phase center and the fourth phase center are separated by the first distance. Each pair of antenna ports comprises a corresponding first antenna port and second antenna port. Each antenna device comprises at least one corresponding dual polarized antenna element arranged for transmitting and/or receiving signals at a first polarization via the corresponding first antenna port, and for transmitting and/or receiving signals at a second polarization via the corresponding second antenna port. The polarizations are mutually orthogonal. Each antenna arrangement further comprises a beamforming arrangement which comprises four beam ports and is configured to apply beam weights to each one of the antenna ports.

For a first beam port, the beamforming arrangement is arranged to apply a first set of beam weights to the first antenna ports and a second set of beam weights to the second antenna ports, such that the first beam port has certain radiation properties and a first virtual phase center. For a second beam port, the beamforming arrangement is arranged to apply a third set of beam weights to the first antenna ports and a fourth set of beam weights to the second antenna ports. The third and fourth sets of beam weights are chosen such that second beam port has a second virtual phase center and such that the radiation properties correspond to the first beam port. The first virtual phase center and the second virtual phase center are separated by a distance. For a third beam port, the beamforming arrangement is arranged to apply a fifth set of beam weights to the first antenna ports and a sixth set of beam weights to the second antenna ports. For a fourth beam port, the beamforming arrangement is arranged to apply a seventh set of beam to the first antenna ports and an eighth set of beam weights to the second antenna ports.

The fifth set of beam weights is a function of the complex conjugate of the second set of beam weights and the sixth set of beam weights is a function of the complex conjugate of the first set of beam weights. Furthermore, the seventh set of beam weights is a function of the complex conjugate of the fourth set of beam weights, and the eighth set of beam weights is a function of the complex conjugate of the third set of beam weights.

Said object is also obtained by means of a method for generating four beam ports using a first pair of antenna ports related to a first phase center, a second pair of antenna ports related to a second phase center, a third pair of antenna ports related to a third phase center, and a fourth pair of antenna ports related to a fourth phase center. The first phase center and the second phase center are separated by a first distance, the second phase center and the third phase center are separated by a second distance, and the third phase center and the fourth phase center are separated by the first distance. Each pair of antenna ports have a corresponding first antenna port and second antenna port. Each first antenna port is used for transmitting and/or receiving signals at a first polarization, and each second antenna port is used for transmitting and/or receiving signals at a second polarization. The polarizations are mutually orthogonal.

The method comprises the steps:

For a first beam port, applying a first set of beam weights to the first antenna ports and a second set of beam weights to the second antenna ports, such that the first beam port has certain radiation properties and a first virtual phase center.

For a second beam port, applying a third set of beam weights to the first antenna ports and a fourth set of beam weights to the second antenna ports. The third set of beam weights and fourth set of beam weights are chosen such that second beam port has a second virtual phase center and such that the radiation properties correspond to the first beam port. The first virtual phase center and the second virtual phase center are separated by a distance.

For a third beam port, applying a fifth set of beam weights to the first antenna ports and a sixth set of beam weights to the second antenna ports.

For a fourth beam port, applying a seventh set of beam weights to the first antenna ports and an eighth set of beam weights to the second antenna ports.

According to the method, the fifth set of beam weights is a function of the complex conjugate of the second set of beam weights, and the sixth set of beam weights is a function of the complex conjugate of the first set of beam weights. Furthermore, the seventh set of beam weights is a function of the complex conjugate of the fourth set of beam weights, and the eighth set of beam weights is a function of the complex conjugate of the third set of beam weights.

According to an example, the first set of beam weights and the second set of beam weights form a first weight vector, the third set of beam weights and the fourth set of beam weights form a second weight vector, the fifth set of beam weights and the sixth set of beam weights form a third weight vector. and the seventh set of beam weights and the eighth set of beam weights form a fourth weight vector.

According to another example, the beam weights of the second weight vector are the same as the beam weights of the first weight vector, where the beam weights of the second weight vector have been moved coherently at least one position in the second weight vector relative the first weight vector. In this way, at least two beam weights that are constituted by zeroes in the first weight vector have been changed to beam weights that differs from zero in the second weight vector, and at least two beam weights that differ from zero in the first weight vector have been changed to beam weights that are constituted by zeroes in the second weight vector.

According to another example, the beam weights of the third weight vector are the complex conjugate of the beam weights of the first weight vector in reversed order, and the beam weights in one of the sets of beam weights in the third weight vector have a reversed sign. The beam weights of the fourth weight vector are the complex conjugate of the beam weights of the second weight vector in reversed order. Those beam weights in that set of beam weights in the fourth weight vector that corresponds to the set of beam weights in the third weight vector with reversed sign, also have a reversed sign.

More examples are disclosed in the dependent claims.

A number of advantages are obtained by means of the present invention. Mainly, the present invention enables antenna beam ports, such as for example CRS ports, to have desired characteristics over a variety of antenna properties and with maintained good power utilization.

BRIEF DESCRIPTION OF THE DRAWINGS

The present invention will now be described more in detail with reference to the appended drawings, where.

DETAILED DESCRIPTION

Figure 1:
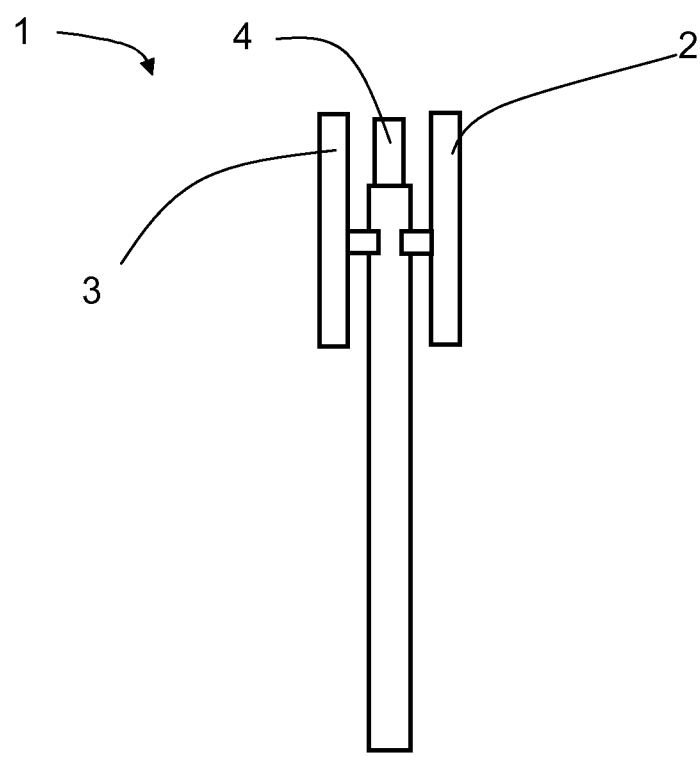
FIG. 1 shows a schematical view of a node in a wireless communication system.

With reference to FIG. 1, there is a node 1 in a wireless communication arrangement W, the node comprising a first antenna arrangement 2, a second antenna arrangement 3 and a third antenna arrangement 4, where each antenna arrangement 2, 3, 4 is adapted to cover a certain sector in an azimuth plane in a previously known manner.

In the following, the first antenna arrangement 2 will be described more in detail, but this description is also valid for the other antenna arrangements 3, 4. The first antenna arrangement 2 comprises a first antenna device 5 with a first pair of antenna ports A and a first phase center 6, a second antenna device 7 with a second pair of antenna ports B and a second phase center 8, a third antenna device 9 with a third pair of antenna ports C and a third phase center 10, and a fourth antenna device 11 with a fourth pair of antenna ports D and a fourth phase center 12. The first phase center 6 and the second phase center 8 are separated by a first distance $D_1$, the second phase center 8 and the third phase center 10 are separated by a second distance $D_2$, and the third phase center 10 and the fourth phase center 12 are separated by the first distance $D_1$.

Each pair of antenna ports A, B, C, D comprises a corresponding first antenna port P1A, P1B, P1C, P1D and second antenna port P2A, P2B, P2C, P2D. This means that the first pair of antenna ports A comprises a corresponding first antenna port P1A and second antenna port P2A, the second pair of antenna ports B comprises a corresponding first antenna port P1B and second antenna port P2B, the third pair of antenna ports C comprises a corresponding first antenna port P1C and second antenna port P2C, and finally that the fourth pair of antenna ports D comprises a corresponding first antenna port P1D and second antenna port P2D.

Furthermore, each antenna device 5, 7, 9, 11 comprises at least one corresponding dual polarized antenna element 13, 14, 15, 16 arranged for transmitting and/or receiving signals at a first polarization P1 via the corresponding first antenna port P1A, P1B, P1C, P1D and for transmitting and/or receiving signals at a second polarization P2 via the corresponding second antenna port P2A, P2B, P2C, P2D. The polarizations P1, P2 are mutually orthogonal.

Figure 2:
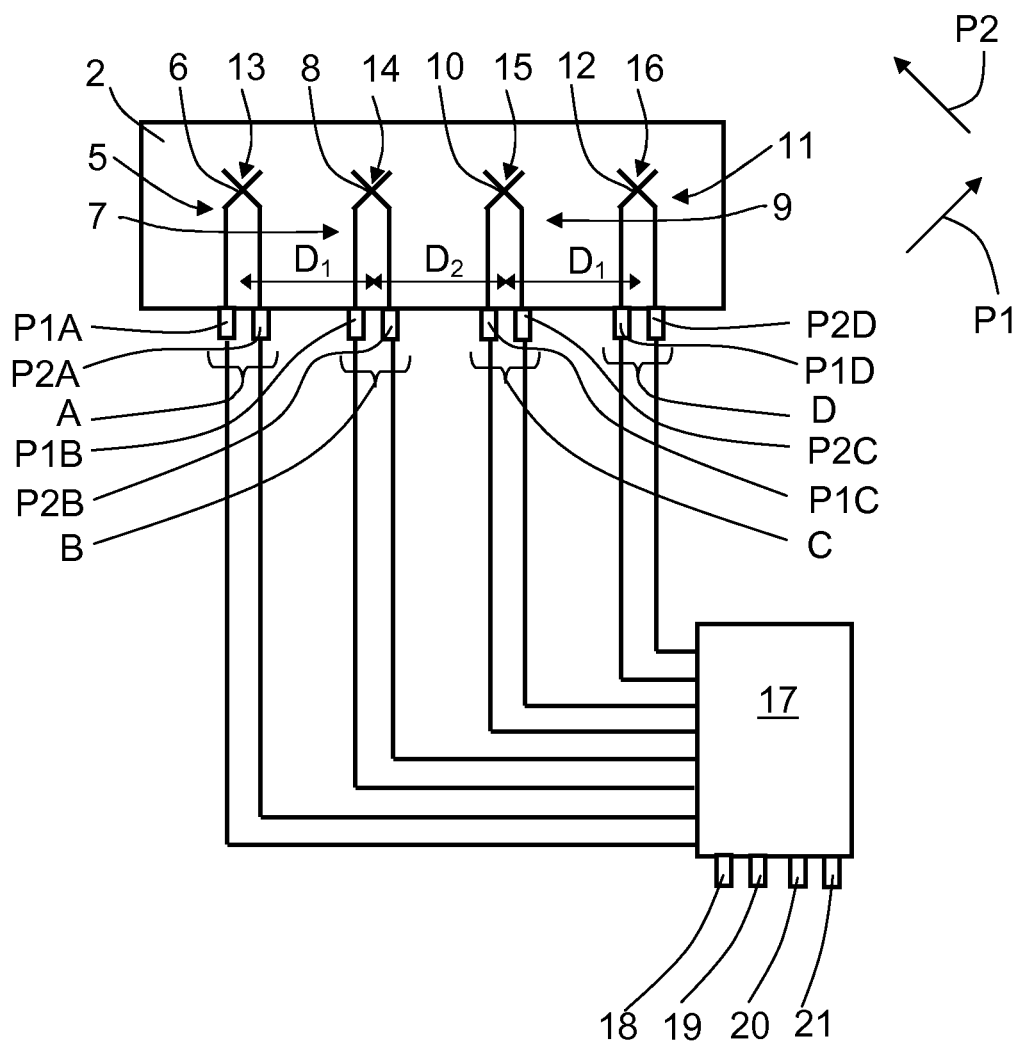
FIG. 2 shows a schematical view of an antenna arrangement according to the present invention.

This means that the first antenna device 5 comprises at least one corresponding dual polarized antenna element 13, the second antenna device 7 comprises at least one corresponding dual polarized antenna element 14, the third antenna device 9 comprises at least one corresponding dual polarized antenna element 15, and that the fourth antenna device 11 comprises at least one corresponding dual polarized antenna element 15. In FIG. 2, only one dual polarized antenna element is shown for each antenna device, but there may be a plurality of dual polarized antenna elements for each antenna device. Each dual polarized antenna element as shown in FIG. 2 may then be regarded as representing a plurality of dual polarized antenna elements, for example in the form of an antenna column.

The first antenna arrangement 2 further comprises a beamforming arrangement 17 which comprises four beam ports 18, 19, 20, 21 and is configured to apply beam weights to each one of the antenna ports P1A, P1B, P1C, P1D; P2A, P2B, P2C, P2D.

The beamforming arrangement 17 is in this example ideally arranged to generate Gaussian shaped power patterns with a half power beamwidth of about 65° with antenna elements with a half power beamwidth of about 90° where the first distance $D_1$ and the second distance $D_2$ both constitute a column distance and are about 0.5 wavelengths for a chosen frequency such as a center frequency. It is to be noted that this is just an example and the invention is not limited to be applicable for these specific parameters but can be applied for a variety of parameters. The Gaussian shape is a goal, but practically the shape will not be perfectly Gaussian.

In the following, beam weight vectors will have weight elements applied in a certain order; the first antenna port P1A of the first antenna device 5, the first antenna port P1B of the second antenna device 7, the first antenna port P1C of the third antenna device 9, the first antenna port P1D of the fourth antenna device 11, the second antenna port P2A of the first antenna device 5, the second antenna port P2B of the second antenna device 7, the second antenna port P2C of the third antenna device 9 and the second antenna port P2D of the fourth antenna device 11.

In short, for a certain beam weight vector w, the elements will apply to the ports in the order:

$$w = \begin{bmatrix} P1A \\ P1B \\ P1C \\ P1D \\ P2A \\ P2B \\ P2C \\ P2D \end{bmatrix}$$

According to a first example, a first weight vector $w_1$ for generating the first beam port 18 based on DPBF (dual polarized beam forming) with 4 non-zero elements is:

$$w_1 = \begin{bmatrix} a_1 \\ a_2 \\ 0 \\ 0 \\ b_1 \\ b_2 \\ 0 \\ 0 \end{bmatrix}$$

The first weight vector $w_1$ implies that a signal is applied to the first ports P1A, P1B of the first antenna device 5 and the second antenna device 7, and to the second ports P2A, P2B of the first antenna device 5 and the second antenna device 7.

According to the present invention, a second weight vector $w_2$ for generating the second beam port 19 is acquired from the first weight vector $w_1$ by applying the same weights, but to the third antenna device 9 and the fourth antenna device 11, i.e. by shifting the weights two steps. This will result in a second beam port 19 with the same polarization as the first beam port 18, but with another phase center. In the first example, the first distance $D_1$ equals the second distance $D_2$, the phase centers being separated by two first distances $D_1$.

The second weight vector $w_2$ is then written as:

$$w_2 = \begin{bmatrix} 0 \\ 0 \\ a_1 \\ a_2 \\ 0 \\ 0 \\ b_1 \\ b_2 \end{bmatrix}$$

A third weight vector $w_3$ for generating the third beam port 20 is acquired from the first weight vector $w_1$. The beam weights of the third weight vector $w_3$ are the complex conjugate of the non-zero beam weights of the first weight vector $w_1$ in reversed order, and the beam weights for the second polarization P2 in the third weight vector $w_3$ have a reversed sign.

The third weight vector $w_3$ is then written as:

$$w_3 = \begin{bmatrix} b_2^* \\ b_1^* \\ 0 \\ 0 \\ -a_2^* \\ -a_1^* \\ 0 \\ 0 \end{bmatrix}$$

A fourth weight vector $w_4$ for generating the fourth beam port 21 is acquired from the second weight vector $w_2$ in the same way as the third weight vector $w_3$ was acquired from the first weight vector $w_1$ as described above. More in detail, the beam weights of the fourth weight vector $w_4$ are the complex conjugate of the beam weights of the second weight vector $w_2$ in reversed order, and the beam weights for the second polarization P2 in the fourth weight vector $w_4$ have a reversed sign.

The fourth weight vector $w_4$ is then written as:

$$w_4 = \begin{bmatrix} 0 \\ 0 \\ b_2^* \\ b_1^* \\ 0 \\ 0 \\ -a_2^* \\ -a_1^* \end{bmatrix}$$

The total weight matrix W defining all four beam ports 18, 19, 20, 21 can now be written as:

$$W = \begin{bmatrix} a_1 & 0 & b_2^* & 0 \\ a_2 & 0 & b_1^* & 0 \\ 0 & a_1 & 0 & b_2^* \\ 0 & a_2 & 0 & b_1^* \\ b_1 & 0 & -a_2^* & 0 \\ b_2 & 0 & -a_1^* & 0 \\ 0 & b_1 & 0 & -a_2^* \\ 0 & b_2 & 0 & -a_1^* \end{bmatrix}$$

The third beam port 20 and the fourth beam port 21 are thus generated from the first beam port 18 and second beam port 19, respectively, by applying a rule assuring that the power pattern is maintained whereas the polarization states are maintained mutually orthogonal in all directions. The directions of the orthogonal polarization states are not constant, but change at different spatial angles, while always remaining orthogonal.

In the example above, some beam weights in the third weight vector $w_3$ and the fourth weight vector $w_4$ have a reversed sign. Furthermore, as a general example, the weights in column three, defined by the third weight vector $w_3$, and consequently also the weights in column four, defined by the fourth weight vector $w_4$, may all also be scaled with any suitable complex scaling factor as long as the same scaling is applied to all elements, i.e., the polarization state remains unchanged.

As can be seen from the total weight matrix W, each antenna device is used by two beam ports, which means that the two beam ports will share the same radio resources.

A numerical example of a the first weight vector $w_1$ according to the first example is:

$$W = \begin{bmatrix} 1 \\ 0.68 + i0.73 \\ 0 \\ 0 \\ 1 \\ 0.68 - i0.73 \\ 0 \\ 0 \end{bmatrix}$$

All weights have the same magnitude, resulting in that the power utilization is 100%.

Based on the concept of reusing radio resources, several options to design the total weight matrix W exists, the one showed in the first example above being one example.

According to a second example, each beam ports 18, 19, 20, 21 may be mapped to three antenna devices for both polarizations, such that the first weight vector $w_1$ is written as:

$$w_1 = \begin{bmatrix} a_1 \\ a_2 \\ a_3 \\ 0 \\ b_1 \\ b_2 \\ b_3 \\ 0 \end{bmatrix}$$

The second weight vector $w_2$ for the second beam port 19 can be found by shifting the weights in the first weight vector $w_1$ one element, giving a beam with the same characteristics as the first with the phase centers being separated by one first distance $D_1$ compared to the beam at the first beam port, where the first distance $D_1$ equals the second distance $D_2$. The weights for the third beam port 20 and the fourth beam ports 21 are found in the same way as before. The total weight matrix W then becomes:

$$W = \begin{bmatrix} a_1 & 0 & b_3^* & 0 \\ a_2 & a_1 & b_2^* & b_3^* \\ a_3 & a_2 & b_1^* & b_2^* \\ 0 & a_3 & 0 & b_1^* \\ b_1 & 0 & -a_3^* & 0 \\ b_2 & b_1 & -a_2^* & -a_3^* \\ b_3 & b_2 & -a_1^* & -a_2^* \\ 0 & b_3 & 0 & -a_1^* \end{bmatrix}$$

As can be seen from the total weight matrix W according to the second example above, the first antenna device 5 and the fourth antenna device 11, i.e. the outer antenna devices, are here used by two beam ports whereas the second antenna device 7 and the third antenna device 9, i.e. the two central antenna devices, are used by all four beam ports. So assuming all beam ports are loaded to the same extent, i.e. that the magnitudes of all the weights are equal, there will be some power loss due to the lower loading of the outer antenna devices 5, 11 assuming all power amplifiers are equal. The loss in total maximal output power $L_{max\ power}$ is in the order of one dB, or:

$$L_{max\ power} = 10\log_{10}\left(\frac{0.5 + 1 + 1 + 0.5}{4}\right)$$

Even more general designs of the total weight matrix W exist, where the weights for the first beam port 18 and the second beam port 19 are designed to have, to a sufficient degree, the same power patterns and phase responses plus that the phase center separation is the desired, often in the order of 0.5 wavelengths. Another design target can be equal power utilization for all radio chains. Then again the third and the fourths weights are designed as described above. According to a third example, the total weight matrix W becomes:

$$W = \begin{bmatrix} a_1 & c_1 & b_4^* & d_4^* \\ a_2 & c_2 & b_3^* & d_3^* \\ a_3 & c_3 & b_2^* & d_2^* \\ a_4 & c_4 & b_1^* & d_1^* \\ b_1 & d_1 & -a_4^* & -c_4^* \\ b_2 & d_2 & -a_3^* & -c_3^* \\ b_3 & d_3 & -a_2^* & -c_2^* \\ b_4 & d_4 & -a_1^* & -c_1^* \end{bmatrix}$$

In this general example, one or more elements per column may be zero.

It should be noted that the present invention does not relate to specific weights, but rather the technique of applying the signal to both polarizations in order to get the desired beam shapes, use power resources in an efficient way and at the same time giving displaced phase centers. The specific weights and weight vectors shown above are more to be seen as examples.

Generally, according to the present invention, for the first beam port 18, the beamforming arrangement 17 is arranged to apply a first set of beam weights, $a_1$, $a_2$, $a_3$, $a_4$, to the first antenna ports P1A, P1B, P1C, P1D, and a second set of beam weights, $b_1$, $b_2$, $b_3$, $b_4$, to the second antenna ports P2A, P2B, P2C, P2D, such that the first beam port 18 has certain radiation properties and a first virtual phase center.

For the second beam port 19, the beamforming arrangement 17 is arranged to apply a third set of beam weights, $c_1$, $c_2$, $c_3$, $c_4$, to the first antenna ports P1A, P1B, P1C, P1D and a fourth set of beam weights, $d_1$, $d_2$, $d_3$, $d_4$, to the second antenna ports P2A, P2B, P2C, P2D. Said third set of beam weights and fourth set of beam weights are chosen such that second beam port 19 has a second virtual phase center, and such that the radiation properties correspond to the first beam port 18, where the first virtual phase center and the second virtual phase center are separated by a distance.

For the third beam port 20, the beamforming arrangement 17 is arranged to apply a fifth set of beam weights, $b_4^*$, $b_3^*$, $b_2^*$, $b_1^*$, to the first antenna ports P1A, P1B, P1C, P1D and a sixth set of beam weights, $-a_4^*$, $-a_3^*$, $-a_2^*$, $-a_1^*$, to the second antenna ports P2A, P2B, P2C, P2D.

For the fourth beam port 21, the beamforming arrangement 17 is arranged to apply a seventh set of beam weights, $d_4^*$, $d_3^*$, $d_2^*$, $d_1^*$, to the first antenna ports P1A, P1B, P1C, P1D and an eighth set of beam weights, $-c_4^*$, $-c_3^*$, $-c_2^*$, $-c_1^*$, to the second antenna ports P2A, P2B, P2C, P2D. The fifth set of beam weights, $b_4^*$, $b_3^*$, $b_2^*$, $b_1^*$, is a function of the complex conjugate of the second set of beam weights, $b_1$, $b_2$, $b_3$, $b_4$, and the sixth set of beam weights, $-a_4^*$, $-a_3^*$, $-a_2^*$, $-a_1^*$, is a function of the complex conjugate of the first set of beam weights, $a_1$, $a_2$, $a_3$, $a_4$. Furthermore, the seventh set of beam weights, $d_4^*$, $d_3^*$, $d_2^*$, $d_1^*$, is a function of the complex conjugate of the fourth set of beam weights, $d_1$, $d_2$, $d_3$, $d_4$, and the eighth set of beam weights, $-c_4^*$, $-c_3^*$, $-c_2^*$, $-c_1^*$, is a function of the complex conjugate of the third set of beam weights, $c_1$, $c_2$, $c_3$, $c_4$.

For example, in accordance with the first example and the second example, the beam weights of the second weight vector $w_2$ are the same as the beam weights of the first weight vector $w_1$. However, the beam weights of the second weight vector $w_2$ have been moved coherently at least one position in the second weight vector $w_2$ relative the first weight vector $w_1$, such that at least two beam weights that are constituted by zeroes in the first weight vector $w_1$ have been changed to beam weights that differs from zero in the second weight vector $w_2$, and such that at least two beam weights that differ from zero in the first weight vector $w_1$ have been changed to beam weights that are constituted by zeroes in the second weight vector $w_2$.

Furthermore, in accordance with all examples, the beam weights, $b_4^*$, $b_3^*$, $b_2^*$, $b_1^*$, $-a_4^*$, $-a_3^*$, $-a_2^*$, $-a_1^*$, of the third weight vector $w_3$ are the complex conjugate of the beam weights, $a_1$, $a_2$, $a_3$, $a_4$, $b_1$, $b_2$, $b_3$, $b_4$, of the first weight vector $w_1$ in reversed order. Also, the beam weights in one of the sets of beam weights, $b_4^*$, $b_3^*$, $b_2^*$, $b_1^*$; $-a_4^*$, $-a_3^*$, $-a_2^*$, $-a_1^*$, in the third weight vector $w_3$ have a reversed sign, and the beam weights $d_4^*$, $d_3^*$, $d_2^*$, $d_1^*$, $-c_4^*$, $-c_3^*$, $-c_2^*$, $-c_1^*$ of the fourth weight vector $w_4$ are the complex conjugate of the beam weights $c_1$, $c_2$, $c_3$, $c_4$, $d_1$, $d_2$, $d_3$, $d_4$ of the second weight vector $w_2$ in reversed order, where those beam weights $-c_4^*$, $-c_3^*$, $-c_2^*$, $-c_1^*$ in that set of beam weights in the fourth weight vector $w_4$ that corresponds to the set of beam weights $-a_4^*$, $-a_3^*$, $-a_2^*$, $-a_1^*$ in the third weight vector $w_3$ with reversed sign, also have a reversed sign.

According to an example, the beam weights $b_4^*$, $b_3^*$, $b_2^*$, $b_1^*$, $-a_4^*$, $-a_3^*$, $-a_2^*$, $-a_1^*$ of the third weight vector $w_3$ may all be subject to a first phase shift $\varphi_1$, and the beam weights $d_4^*$, $d_3^*$, $d_2^*$, $d_1^*$, $-c_4^*$, $-c_3^*$, $-c_2^*$, $-c_1^*$ of the fourth weight vector $w_4$ may all be subject to a second phase shift $\varphi_2$. In order to avoid phase error, or phase difference, between the corresponding beam ports 20, 21, the first phase shift $\varphi_1$ equals the second phase shift $\varphi_2$.

As mentioned above, generally, the weights defined by the third weight vector $w_3$, and consequently also the weights defined by the fourth weight vector $w_4$, may all furthermore be scaled with any suitable complex scaling factor as long as the same scaling is applied to all elements, i.e., the polarization state remains unchanged.

The present invention also relates to a method for generating four beam ports 18, 19, 20, 21 using a first pair of antenna ports A related to a first phase center 6, a second pair of antenna ports B related to a second phase center 8, a third pair of antenna ports C related to a third phase center 10, and a fourth pair of antenna ports D related to a fourth phase center 12. The first phase center 6 and the second phase center 8 are separated by a first distance $D_1$, the second phase center 8 and the third phase center 10 are separated by a second distance $D_2$, and the third phase center 10 and the fourth phase center 12 are separated by the first distance $D_1$. Each pair of antenna ports A, B, C, D has a corresponding first antenna port P1A, P1B, P1C, P1D and second antenna port P2A, P2B, P2C, P2D. Each first antenna port P1A, P1B, P1C, P1D is used for transmitting and/or receiving signals at a first polarization P1, and each second antenna port P2A, P2B, P2C, P2D is used for transmitting and/or receiving signals at a second polarization P2. The polarizations P1, P2 are mutually orthogonal.

Figure 3:
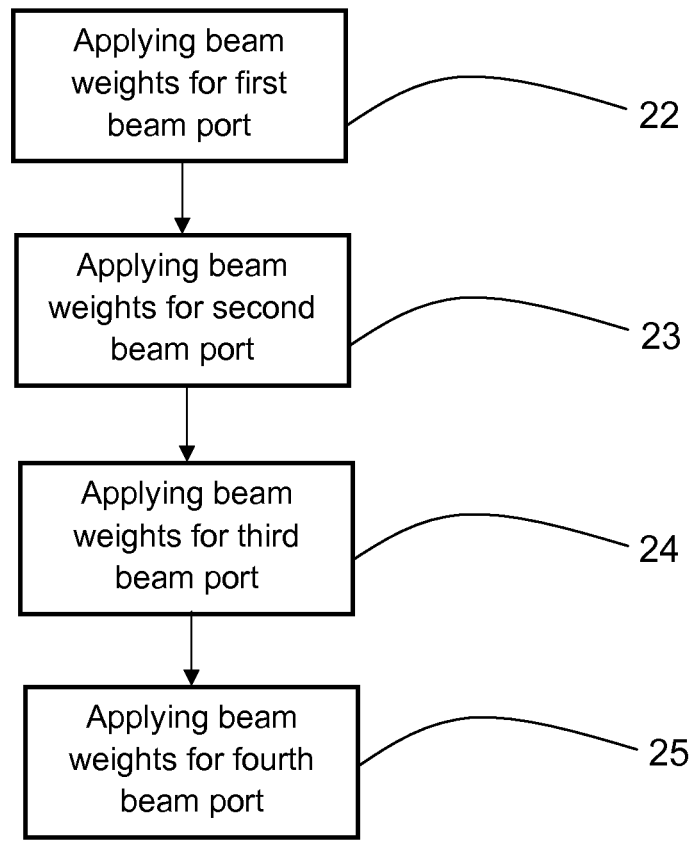
FIG. 3 shows a flowchart of a method according to the present invention.

With reference to FIG. 3, the method comprising the steps:

22: For a first beam port 18, applying a first set of beam weights, $a_1, a_2, a_3, a_4$, to the first antenna ports P1A, P1B, P1C, P1D and a second set of beam weights, $b_1, b_2, b_3, b_4$, to the second antenna ports P2A, P2B, P2C, P2D, such that the first beam port 18 has certain radiation properties and a first virtual phase center.

23: For a second beam port 19, applying a third set of beam weights, $c_1, c_2, c_3, c_4$, to the first antenna ports P1A, P1B, P1C, P1D and a fourth set of beam weights, $d_1, d_2, d_3, d_4$, to the second antenna ports P2A, P2B, P2C, P2D. Said third set of beam weights and fourth set of beam weights are chosen such that second beam port 19 has a second virtual phase center and such that the radiation properties correspond to the first beam port 18, where the first virtual phase center and the second virtual phase center are separated by a distance.

24: For a third beam port 20, applying a fifth set of beam weights, $b_4^*, b_3^*, b_2^*, b_1^*$, to the first antenna ports P1A, P1B, P1C, P1D and a sixth set of beam weights, $-a_4^*, -a_3^*, -a_2^*, -a_1^*$, to the second antenna ports P2A, P2B, P2C, P2D.

25: For a fourth beam port 21, applying a seventh set of beam weights, $d_4^*, d_3^*, d_2^*, d_1^*$, to the first antenna ports P1A, P1B, P1C, P1D and an eighth set of beam weights, $-c_4^*, -c_3^*, -c_2^*, -c_1^*$, to the second antenna ports P2A, P2B, P2C, P2D.

The fifth set of beam weights is a function of the complex conjugate of the second set of beam weights, and the sixth set of beam weights is a function of the complex conjugate of the first set of beam weights. Furthermore, the seventh set of beam weights is a function of the complex conjugate of the fourth set of beam weights, and the eighth set of beam weights is a function of the complex conjugate of the third set of beam weights.

The present invention is not limited to the examples above, but may vary freely within the scope of the appended claims. For example the node may comprise several antenna arrangements, each antenna arrangement being arranged to cover a certain sector. The sector or sectors do not have to lie in an azimuth plane, by may lie in any suitable plane, such as for example an elevation plane.

The antenna elements of each antenna arrangement 2 may be in the form of a one-dimensional array antenna or in the form of a two-dimensional array antenna. Each physical antenna element may in turn be constituted by several sub-elements or even sub-arrays.

Terms such as orthogonal should in this context not be interpreted as mathematically exact, but within what is practically obtainable in this field of technology.

Beam ports of this type are normally created in software by means of matrix multiplication, using a codebook matrix, which in turn is determined by an estimation of the present channel in a previously known manner.

The beam ports may be used for CRS (cell specific reference signal).

The present invention applies not only to three sector systems, but to any type of suitable wireless communication network.

The Gaussian shaped power patterns is only one example of a desired power pattern shape, other shapes are of course possible,

The invention claimed is:

1. A node in a wireless communication network, the node comprising at least one antenna arrangement, where each antenna arrangement in turn comprises a first antenna device with a first pair of antenna ports and a first phase center, a second antenna device with a second pair of antenna ports and a second phase center, a third antenna device with a third pair of antenna ports and a third phase center, and a fourth antenna device with a fourth pair of antenna ports and a fourth phase center, the first phase center and the second phase center being separated by a first distance, the second phase center and the third phase center being separated by a second distance and the third phase center and the fourth phase center being separated by the first distance, each pair of antenna ports comprising a corresponding first antenna port and second antenna port, each antenna device comprising at least one corresponding dual polarized antenna element arranged for transmitting and/or receiving signals at a first polarization via the corresponding first antenna port and for transmitting and/or receiving signals at a second polarization via the corresponding second antenna port, where the polarizations are mutually orthogonal, and where each antenna arrangement further comprises a beamforming arrangement which comprises four beam ports and is configured to apply beam weights ($a_1, a_2, a_3, a_4$; $b_1, b_2, b_3, b_4$; $b_4^*, b_3^*, b_2^*, b_1^*$; $-a_4^*, -a_3^*, -a_2^*, -a_1^*$; $c_1, c_2, c_3, c_4$; $d_1, d_2, d_3, d_4$; $d_4^*, d_3^*, d_2^*, d_1^*$; $-c_4^*, -c_3^*, -c_2^*, -c_1^*$) to each one of the antenna ports, wherein:

for a first beam port, the beamforming arrangement is arranged to apply a first set of beam weights ($a_1, a_2, a_3, a_4$) to the first antenna ports and a second set of beam weights ($b_1, b_2, b_3, b_4$) to the second antenna ports, such that the first beam port has certain radiation properties and a first virtual phase center;

for a second beam port, the beamforming arrangement is arranged to apply a third set of beam weights ($c_1, c_2, c_3, c_4$) to the first antenna ports and a fourth set of beam weights ($d_1, d_2, d_3, d_4$) to the second antenna ports, said third set of beam weights ($c_1, c_2, c_3, c_4$) and fourth set of beam weights ($d_1, d_2, d_3, d_4$) being chosen such that second beam port has a second virtual phase center and such that the radiation properties correspond to the first beam port, where the first virtual phase center and the second virtual phase center are separated by a distance;

for a third beam port, the beamforming arrangement is arranged to apply a fifth set of beam weights ($b_4^*, b_3^*, b_2^*, b_1^*$) to the first antenna ports and a sixth set of beam weights ($-a_4^*, -a_3^*, -a_2^*, -a_1^*$) to the second antenna ports; and for a fourth beam port, the beamforming arrangement is arranged to apply a seventh set of beam weights ($d_4^*, d_3^*, d_2^*, d_1^*$) to the first antenna ports and an eighth set of beam weights ($-c_4^*, -c_3^*, -c_2^*, -c_1^*$) to the second antenna ports, where the fifth set of beam weights ($b_4^*, b_3^*, b_2^*, b_1^*$) is a function of the complex conjugate of the second set of beam weights ($b_1, b_2, b_3, b_4$), where the sixth set of beam weights ($-a_4^*, -a_3^*, -a_2^*, -a_1^*$) is a function of the complex conjugate of the first set of beam weights ($a_1, a_2, a_3, a_4$), where the seventh set of beam weights ($d_4^*, d_3^*, d_2^*, d_1^*$) is a function of the complex conjugate of the fourth set of beam weights ($d_1, d_2, d_3, d_4$), and where the eighth set of beam weights ($-c_4^*, -c_3^*, -c_2^*, -c_1^*$) is a function of the complex conjugate of the third set of beam weights ($c_1, c_2, c_3, c_4$).

2. The node according to claim 1, wherein the first set of beam weights ($a_1, a_2, a_3, a_4$) and the second set of beam weights ($b_1, b_2, b_3, b_4$) form a first weight vector ($w_1$), the third set of beam weights ($c_1, c_2, c_3, c_4$) and the fourth set of beam weights ($d_1, d_2, d_3, d_4$) form a second weight vector ($w_2$), the fifth set of beam weights ($b_4^*, b_3^*, b_2^*, b_1^*$) and the sixth set of beam weights ($-a_4^*, -a_3^*, -a_2^*, -a_1^*$) form a third weight vector ($w_3$), and where the seventh set of beam weights ($d_4^*, d_3^*, d_2^*, d_1^*$) and the eighth set of beam weights ($-c_4^*, -c_3^*, -c_2^*, -c_1^*$) form a fourth weight vector ($w_4$).

3. The node according to claim 2, wherein the beam weights ($0, 0, a_1, a_2, 0, 0, b_1, b_2$) of the second weight vector ($w_2$) are the same as the beam weights ($a_1, a_2, 0, 0, b_1, b_2, 0, 0$) of the first weight vector ($w_1$), where the beam weights ($0, 0, a_1, a_2, 0, 0, b_1, b_2$) of the second weight vector ($w_2$) have been moved coherently at least one position in the second weight vector ($w_2$) relative the first weight vector ($w_1$), such that at least two beam weights that are constituted by zeroes in the first weight vector ($w_1$) have been changed to beam weights that differs from zero in the second weight vector ($w_2$), and such that at least two beam weights that differ from zero in the first weight vector ($w_1$) have been changed to beam weights that are constituted by zeroes in the second weight vector ($w_2$).

4. The node according to claim 3, wherein the beam weights ($b_4^*, b_3^*, b_2^*, b_1^*; -a_4^*, -a_3^*, -a_2^*, -a_1^*$) of the third weight vector ($w_3$) are the complex conjugate of the beam weights ($a_1, a_2, a_3, a_4, b_1, b_2, b_3, b_4$) of the first weight vector ($w_1$) in reversed order and where the beam weights in one of the sets of beam weights ($b_4^*, b_3^*, b_2^*, b_1^*; -a_4^*, -a_3^*, -a_2^*, -a_1^*$) in the third weight vector ($w_3$) have a reversed sign, and where the beam weights ($d_4^*, d_3^*, d_2^*, d_1^*; -c_4^*, -c_3^*, -c_2^*, -c_1^*$) of the fourth weight vector ($w_4$) are the complex conjugate of the beam weights ($c_1, c_2, c_3, c_4, d_1, d_2, d_3, d_4$) of the second weight vector ($w_2$) in reversed order, where those beam weights ($-c_4^*, -c_3^*, -c_2^*, -c_1^*$) in that set of beam weights in the fourth weight vector ($w_4$) that corresponds to the set of beam weights ($-a_4^*, -a_3^*, -a_2^*, -a_1^*$) in the third weight vector ($w_3$) with reversed sign, also have a reversed sign.

5. The node according to claim 3, wherein the beam weights ($b_4^*, b_3^*, b_2^*, b_1^*; -a_4^*, -a_3^*, -a_2^*, -a_1^*$) of the third weight vector ($w_3$) are all subject to a first phase shift ($\varphi_1$), and that the beam weights ($d_4^*, d_3^*, d_2^*, d_1^*; -c_4^*, -c_3^*, -c_2^*, -c_1^*$) of the fourth weight vector ($w_4$) are all subject to a second phase shift ($\varphi_2$), where the first phase shift ($\varphi_1$) equals the second phase shift ($\varphi_2$).

6. A method for generating four beam ports using a first pair of antenna ports related to a first phase center, a second pair of antenna ports related to a second phase center, a third pair of antenna ports related to a third phase center, and a fourth pair of antenna ports related to a fourth phase center, the first phase center and the second phase center being separated by a first distance, the second phase center and the third phase center being separated by a second distance, and the third phase center and the fourth phase center being separated by the first distance, each pair of antenna ports having a corresponding first antenna port and second antenna port, each first antenna port being used for transmitting and/or receiving signals at a first polarization and each second antenna port being used for transmitting and/or receiving signals at a second polarization, where the polarizations are mutually orthogonal, wherein the method comprises the steps:

for a first beam port, applying a first set of beam weights ($a_1, a_2, a_3, a_4$) to the first antenna ports and a second set of beam weights ($b_1, b_2, b_3, b_4$) to the second antenna ports, such that the first beam port has certain radiation properties and a first virtual phase center;

for a second beam port, applying a third set of beam weights ($c_1, c_2, c_3, c_4$) to the first antenna ports and a fourth set of beam weights ($d_1, d_2, d_3, d_4$) to the second antenna ports, said third set of beam weights ($c_1, c_2, c_3, c_4$) and fourth set of beam weights ($d_1, d_2, d_3, d_4$) being chosen such that second beam port has a second virtual phase center and such that the radiation properties correspond to the first beam port, where the first virtual phase center and the second virtual phase center are separated by a distance;

for a third beam port, applying a fifth set of beam weights ($b_4^*, b_3^*, b_2^*, b_1^*$) to the first antenna ports and a sixth set of beam weights ($-a_4^*, -a_3^*, -a_2^*, -a_1^*$) to the second antenna ports; and for a fourth beam port, applying a seventh set of beam weights ($d_4^*, d_3^*, d_2^*, d_1^*$) to the first antenna ports and an eighth set of beam weights ($-c_4^*, -c_3^*, -c_2^*, -c_1^*$) to the second antenna ports, where the fifth set of beam weights ($b_4^*, b_3^*, b_2^*, b_1^*$) is a function of the complex conjugate of the second set of beam weights ($b_1, b_2, b_3, b_4$), where the sixth set of beam weights ($-a_4^*, -a_3^*, -a_2^*, -a_1^*$) is a function of the complex conjugate of the first set of beam weights ($a_1, a_2, a_3, a_4$), where the seventh set of beam weights ($d_4^*, d_3^*, d_2^*, d_1^*$) is a function of the complex conjugate of the fourth set of beam weights ($d_1, d_2, d_3, d_4$), and where the eighth set of beam weights ($-c_4^*, -c_3^*, -c_2^*, -c_1^*$) is a function of the complex conjugate of the third set of beam weights ($c_1, c_2, c_3, c_4$).

7. The method according to claim 6, wherein the first set of beam weights ($a_1, a_2, a_3, a_4$) and the second set of beam weights ($b_1, b_2, b_3, b_4$) form a first weight vector ($w_1$), the third set of beam weights ($c_1, c_2, c_3, c_4$) and the fourth set of beam weights ($d_1, d_2, d_3, d_4$) form a second weight vector ($w_2$), the fifth set of beam weights ($b_4^*, b_3^*, b_2^*, b_1^*$) and the sixth set of beam weights ($-a_4^*, -a_3^*, -a_2^*, -a_1^*$) form a third weight vector ($w_3$), and where the seventh set of beam weights ($d_4^*, d_3^*, d_2^*, d_1^*$) and the eighth set of beam weights ($-c_4^*, -c_3^*, -c_2^*, -c_1^*$) form a fourth weight vector ($w_4$).

8. The method according to claim 7, wherein the beam weights ($0, 0, a_1, a_2, 0, 0, b_1, b_2$) of the second weight vector ($w_2$) are the same as the beam weights ($a_1, a_2, 0, 0, b_1, b_2, 0, 0$) of the first weight vector ($w_1$), where the beam weights ($0, 0, a_1, a_2, 0, 0, b_1, b_2$) of the second weight vector ($w_2$) have been moved coherently at least one position in the second weight vector ($w_2$) relative the first weight vector ($w_1$), such that at least two beam weights that are constituted by zeroes in the first weight vector ($w_1$) have been changed to beam weights that differs from zero in the second weight vector ($w_2$), and such that at least two beam weights that differ from zero in the first weight vector ($w_1$) have been changed to beam weights that are constituted by zeroes in the second weight vector ($w_2$).

9. The method according to claim 8, wherein the beam weights ($b_4^*, b_3^*, b_2^*, b_1^*; -a_4^*, -a_3^*, -a_2^*, -a_1^*$) of the third weight vector ($w_3$) are the complex conjugate of the beam weights ($a_1, a_2, a_3, a_4, b_1, b_2, b_3,$ of the first weight vector ($w_1$) in reversed order and where the beam weights in one of the sets of beam weights ($b_4^*$, $b_3^*$, $b_2^*$, $b_1^*$; $-a_4^*$, $-a_3^*$, $-a_2^*$, $-a_1^*$) in the third weight vector ($w_3$) have a reversed sign, and where the beam weights ($d_4^*$, $d_3^*$, $d_2^*$, $d_1^*$; $-c_4^*$, $-c_3^*$, $-c_2^*$, $-c_1^*$) of the fourth weight vector ($w_4$) are the complex conjugate of the beam weights ($c_1$, $c_2$, $c_3$, $c_4$, $d_1$, $d_2$, $d_3$, $d_4$) of the second weight vector ($w_2$) in reversed order, where those beam weights ($-c_4^*$, $-c_3^*$, $-c_2^*$, $-c_1^*$) in that set of beam weights in the fourth weight vector ($w_4$) that corresponds to the set of beam weights ($-a_4^*$, $-a_3^*$, $-a_2^*$, $-a_1^*$) in the third weight vector ($w_3$) with reversed sign, also have a reversed sign.

10. The method according to claim 8, wherein the beam weights ($b_4^*$, $b_3^*$, $b_2^*$, $b_1^*$; $-a_4^*$, $-a_3^*$, $-a_2^*$, $-a_1^*$) of the third weight vector ($w_3$) are all subject to a first phase shift ($\varphi_1$), and that the beam weights ($d_4^*$, $d_3^*$, $d_2^*$, $d_1^*$; $-c_4^*$, $-c_3^*$, $-c_2^*$, $-c_1^*$) of the fourth weight vector ($w_4$) are all subject to a second phase shift ($\varphi_2$), where the first phase shift ($\varphi_1$) equals the second phase shift ($\varphi_2$).

* * * * *